United States Patent [19]

Westphal

[11] Patent Number: 4,576,450

[45] Date of Patent: Mar. 18, 1986

[54] MICROSCOPE TUBE HAVING RELATIVELY SWINGING SECTIONS

[75] Inventor: Klaus Westphal, Oberkochen, Fed. Rep. of Germany

[73] Assignee: Carl-Zeiss-Stiftung, Heidenheim on the Brenz, Fed. Rep. of Germany

[21] Appl. No.: 579,161

[22] Filed: Feb. 10, 1984

[51] Int. Cl.<sup>4</sup> .............................................. G02B 21/00
[52] U.S. Cl. .................................... 350/522; 350/511
[58] Field of Search ............................... 350/507, 522

[56] References Cited

U.S. PATENT DOCUMENTS

| 2,439,526 | 4/1948 | Ott | 350/522 |
| 3,887,267 | 1/1975 | Heller | 350/522 |
| 4,299,439 | 11/1981 | Strömblad | 350/522 |

FOREIGN PATENT DOCUMENTS

| 1098233 | 1/1961 | Fed. Rep. of Germany . |
| 1210204 | 3/1966 | Fed. Rep. of Germany . |
| 2754614 | 6/1979 | Fed. Rep. of Germany . |
| 3127990 | 11/1982 | Fed. Rep. of Germany . |

Primary Examiner—John K. Corbin
Assistant Examiner—Loha Ben

Attorney, Agent, or Firm—Stonebraker, Shepard & Stephens

[57] ABSTRACT

A microscope tube having several sections articulated with respect to each other. A first stationary section (1) is hinged to a second section (2) which can swing upwardly and downwardly, and this is hinged to a third section (3) which hangs downwardly from the second section, the free lower end of the third section being swingable horizontally toward and away from the observer or user of the microscope. The third section has a fourth section (4) hinged to it to tilt on a horizontal axis, and this fourth section carries the eyepiece of the microscope. With this arrangement, the eyepiece may be adjusted to various positions vertically and horizontally to suit the comfort of the observer, and may be tilted to various viewing angles quite independently of its vertical or horizontal position. Mirrors within the tube at the hinge joints direct the optical beam properly from one section into the next section, and these mirrors turn through half the angle of swing when one section swings relative to the next. An additional optical system within the tube forms an intermediate image, and the observer sees the object in proper erect position in proper side-to-side relationship, rather than reversed. Provision is made for attachment of a camera or other desired auxiliary apparatus.

13 Claims, 5 Drawing Figures

MICROSCOPE TUBE HAVING RELATIVELY SWINGING SECTIONS

The present invention relates to an articulated microscope tube having sections or portions hinged to each other in such a way as to provide for adjusting not only the height of the eyepiece or ocular relative to the main body and the objective of the microscope, but also the angle of viewing of the eyepiece relative to the optical axis of the objective. These two adjustment possibilities, in combination with each other, make it possible to accommodate the position and orientation of the eyepiece, easily and quickly, to observers of different height and to different degrees of tilting of the heads of the observers, without having to change the position of the microscope body or of the objective lens.

For a long time, it has been known in the art to provide microscope tubes allowing some limited degree of displacement of the eyepiece, thus affording the user the increased comfort of a viewing station or eyepiece which is adjustable either in height or in angle.

For example, U.S. Pat. No. 2,439,526 to Ott, granted Apr. 13, 1948, discloses a microscope with an eyepiece which is tiltable upwardly and downwardly through a range from about 60° to about 90° relative to a horizontal plane.

German Federal Republic Pat. No. 1,098,233 to Leitz, published Aug. 3, 1961, discloses a binocular tube swingably connected to the microscope tube in a way which permits adjustment of the height of observation through the eyepiece. However, the axis of swing is directly behind the eyepiece, so that any intended adjustment of height necessarily results in a change in the angle of observation.

In German Federal Republic Gebrauchsmuster (utility model or petty patent) No. 79 31 427 of Feb. 7, 1980, to Carl Zeiss, and in the corresponding U.S. Pat. No. 4,299,439 to Stromblad, granted Nov. 10, 1981, there is disclosed a microscope with an intermediate tube swingable for height adjustment, with the axis of swing located relatively remote from the observer, so that only a slight change in the angle of observation takes place during the course of an adjustment in height. But even with this construction, the adjustments for height and for angle of observation are not independent of each other.

Ideally, the two adjusting movements should be separate and independent of each other, since the height adjustment depends on the height of the observer who is using the microscope, and the angle adjustment depends on the position in which the observer finds it most convenient and comfortable to hold or tilt his head as he looks into the microscope eyepiece or ocular, this position being entirely independent of the observer's height. The prior art, as exemplified by the documents above cited, does not permit this highly desirable independent adjustment.

Furthermore, none of the known swingable microscope tubes affords the possibility of displacing the eyepiece in depth, that is, in the direction of the optical axes of the eye tubes. Such an adjustment in depth would be advantageous, especially for prolonged microscope work, since it would make it easier for the observer to change the position in which he sits, and thus would contribute to fatigue-free work.

The object of the present invention is to provide an improved microscope tube so constructed that both the height of the eyepiece and the angle of the eyepiece may be separately adjusted, and that the depth of the eyepiece (i.e., its location along the optical axis of the eyepiece) may also be adjusted, all these adjusting movements being, so far as possible, independent of each other.

This object is achieved by providing a lens tube which is hinged on at least two hinge axes parallel to each other and spaced from each other by a distance which is substantially equal to the extension in depth of the tube. The ray path from the microscope objective to the eyepiece is guided within this articulated tube.

Preferably the tube has a crane-like construction, with an extension arm which is substantially horizontal or slightly inclined to the horizontal and which can be swung about the first hinge axis of the tube, which serves for the height adjustment of the eyepiece. The tube also has a carrier arm hinged to the extension arm for swinging on a second hinge axis spaced from the first hinge axis and preferably parallel to it. This carrier arm extends substantially vertically or slightly inclined to the vertical. Its swinging movement on the second axis serves for the adjustment in depth. The eyepiece or ocular is fastened to the free end of the carrier arm, and is swingable about a third hinge axis.

By this construction, it is assured that all three adjustments of the tube, to vary the position of the eyepiece in height, in depth, and in viewing angle, can be effected independently of each other. Furthermore, it is advantageous for the three hinges to be connected to each other by a parallelogram-like link transmission of the type used for guiding a straight edge on a drawing board. With such an arrangement, the eyepiece can be displaced as desired in height and in depth without the angle of observation being unintentionally changed.

Attachments may be used for reflecting the ray path into various optical accessories, such as photographic cameras, television cameras, projection screens, or the like. Also an attachment may be used for reflecting a light marker or a scale, for example, into the ray path. Preferably such attachments are arranged on the stationary portion of the microscope tube, or on the main stationary body of the microscope, rather than on one of the adjustable sections of the tube.

For guiding the ray path at the hinges of the tube, there may be used, in known manner, mirrors having reflecting surfaces which lie in the axis of rotation of the hinge, the mirrors being turned by transmission means which reduces the swing of the mirror to one-half the angle of swing of the hinge. But alternatively, instead of these half-swing mirrors, it is possible to develop the ray transmission at the hinges in the manner disclosed in the German Federal Republic Offenlegungsschrift (unexamined but published patent application) No. 25 02 209 of Wild Heerbrugge AG, published Aug. 21, 1975.

It is also advantageous for the tube to contain an optical system which forms an intermediate image by which, among other things, the erecting of the microscope image is effected.

BRIEF DESCRIPTION OF THE DRAWINGS

A preferred embodiment of the invention will be disclosed, by way of example, with reference to the accompanying drawings, in which.

DETAILED DESCRIPTION OF PREFERRED EMBODIMENT

Figure 1:
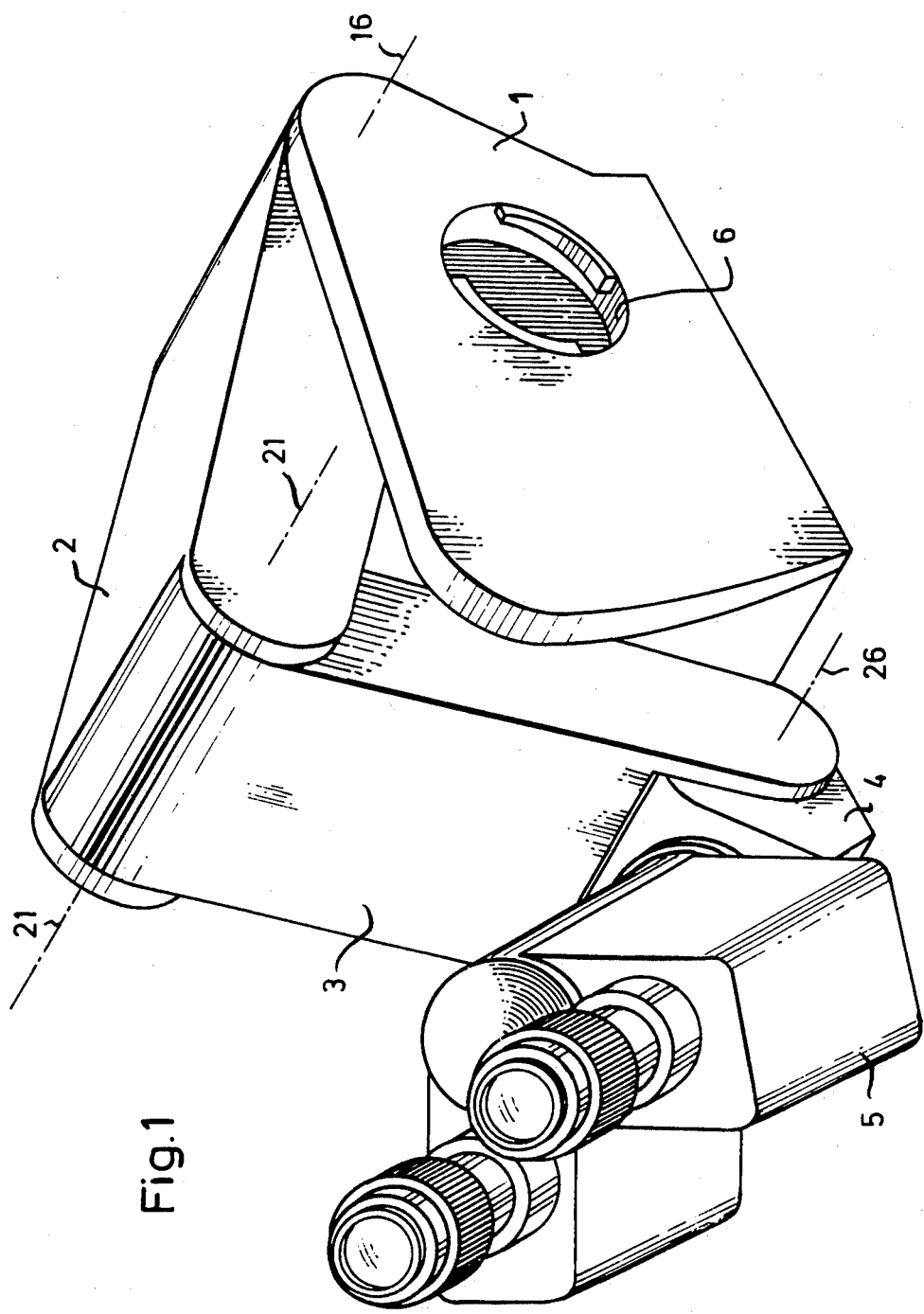
FIG. 1 is an overall perspective view of the microscope tube.
Figure 2:
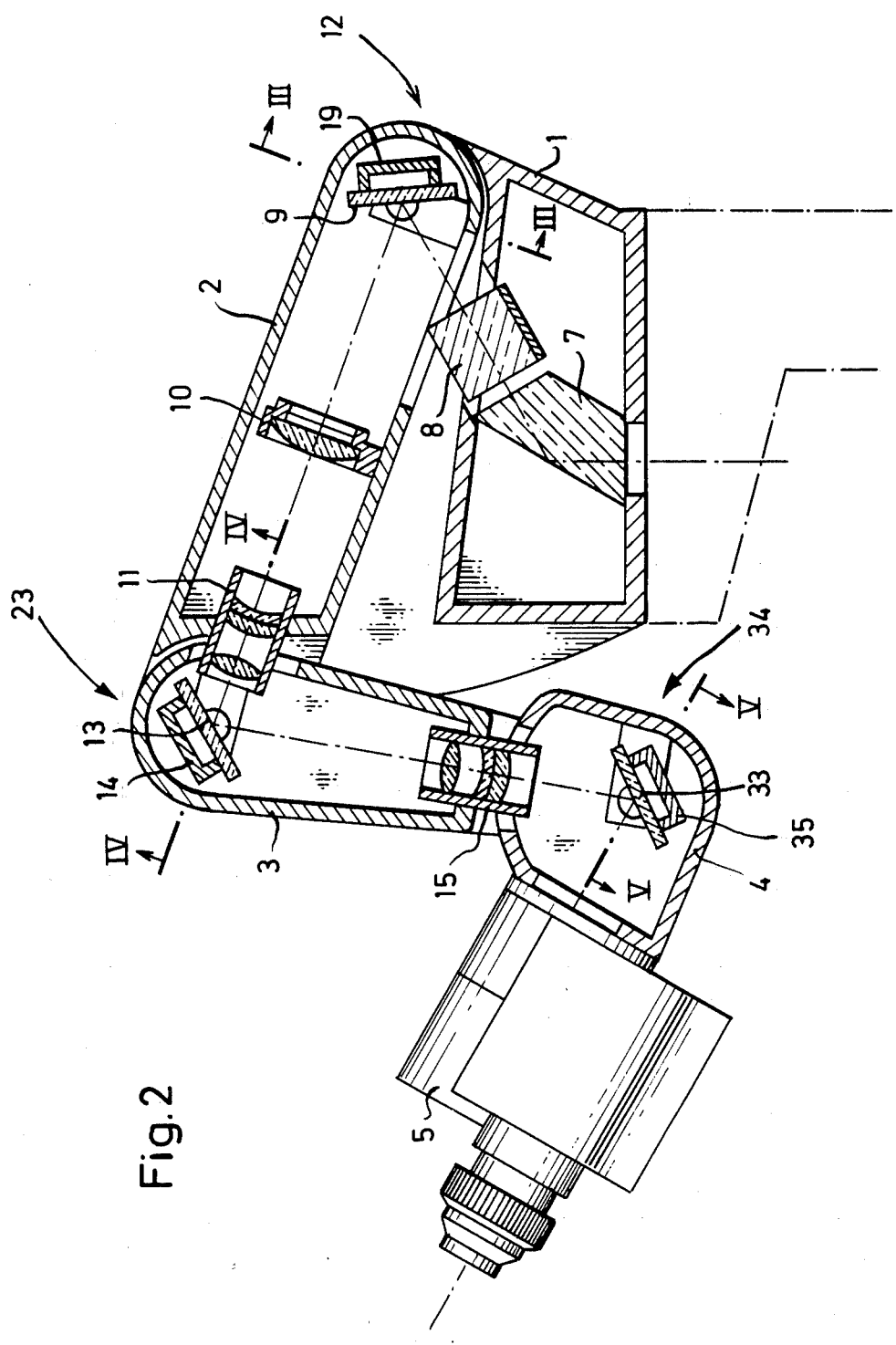
FIG. 2 is a view of the same partly in side elevation and partly in vertical section taken along the optical axis of the tube.

Referring now to FIGS. 1 and 2, the preferred embodiment of the invention has a stationary housing part 1 which can be fastened in any known manner to the stand of a known vertical microscope. On this housing part 1 an extension arm 2 is mounted for upward and downward swinging on a first hinge indicated in general at 12 (FIG. 2) about a horizontal swing axis 16 (FIG. 1) which is arranged at the end of the part 1 which is remote from the observer using the microscope. This extension arm 2 normally extends approximately horizontally or inclined slightly upwardly as illustrated.

On the free end of this extension arm (i.e., the forward end, closest to the user) there is mounted a carrier arm 3 for swinging on a second hinge indicated in general at 23 (FIG. 2) about a second horizontal swing axis 21 (FIG. 1). The carrier arm 3 normally hangs down approximately vertically or slightly inclined to the vertical as illustrated.

To the lower end of the carrier arm 3 there is attached an eyepiece attachment 4, which swings relative to the carrier arm on a third hinge indicated in general at 34 (FIG. 2), the swing axis of which is also horizontal and is indicated at 26 of FIG. 1. The three swing axes 16, 21, and 26 are parallel to each other. A conventional binocular eyepiece tube 5 is detachably mounted on the eyepiece attachment 4.

A side wall of the stationary part 1 has a bayonet socket 6 (FIG. 1) and there is a similar bayonet socket in the opposite side wall, not visible in the drawing. Either or both of these bayonet sockets may be used for mounting auxiliary equipment such as photographic cameras, television cameras, projectors for projecting the microscope image onto a viewing screen, projectors for projecting a scale or a reference mark into the ray path of the microscope so as to be visible to the observer looking into the eyepiece of the microscope, or any other known forms of auxiliary apparatus useful with microscopes. When apparatus is not attached to either of these sockets, the socket opening is closed by a conventional dust cover, not shown.

As shown in FIG. 2, the microscope ray path passes through the tube parts 1, 2, 3, and 4 which are pivotally connected to each other, and leads to the eyepiece (or the two binocular eyepieces, sometimes referred to collectively as the eyepiece). The observation beam comes from the conventional objective (not shown) which is mounted in known manner on the stand of the microscope. Coming upwardly from this objective, the beam is reflected in a direction away from the observer and toward the axis 16 of the first hinge, by the reflective surface of a trapezoidal prism 7 fastened in the tube part 1.

From this prism 7, the beam passes through the optical element 8 (further mentioned below) and strikes a mirror 9 located at the first hinge axis 16. This mirror reflects the beam in a direction toward the second hinge axis 21 of the second hinge 23 at the forward end of the extension arm 2.

The above mentioned element 8 is a beam-splitting cube which reflects part of the light coming from the objective to one or both of the bayonet mount openings 6. This beam splitter is constructed, in known manner, so that it can be switched or moved to different positions by an accessible handle or operating member. In one position of the beam-splitter cube, all of the light from the objective is sent to the eyepiece for viewing by the observer. In another position, all of the light is sent to one of the openings 6; in another, part to one opening and part to the other opening on the opposite side of the microscope. In other positions, the light from the objective is split or divided in any desired ratio, for example 70% to the observer and 30% to an auxiliary unit at one opening 6, or part to each opening, or the light coming in from an opening 6, as from a scale projector, is reflected to the eyepiece.

Within the extension arm 2 there is a lens holder 10 which carries a field lens and a diaphragm. At this place, an intermediate image of the object being observed is produced. This intermediate image is imaged again by a telecentric lens system mounted in the two mounting tubes 11 and 15. The second intermediate image is produced in the ocular (eyepiece tube 5) after two reflections by the mirrors 13 and 33 whose reflective surfaces lie respectively in the rotation axes 21 and 26 of the respective hinges 23 and 34. With this twin construction and the four reflections, the observer sees an erect image in proper erect relationship, which facilitates manipulation of the object.

When the tube parts 2, 3, and 4 swing on their respective hinges 12, 23, and 34, the mirrors 9, 13, and 33 arranged in the axes of these hinges turn through only half the angle of swing, so that the position of the image in the tube remains the same. This result is obtained by constructing the hinges and the mirror mounts in the manner shown in further detail in FIGS. 3, 4, and 5.

Figure 3:
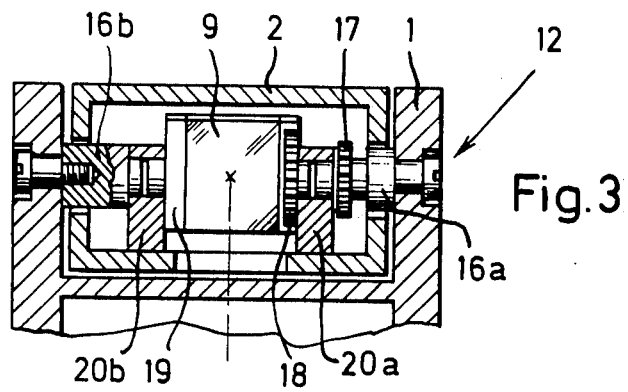
FIG. 3 is a fragmentary section through the first hinge, taken approximately on the line III—III of FIG. 2.
Figure 4:
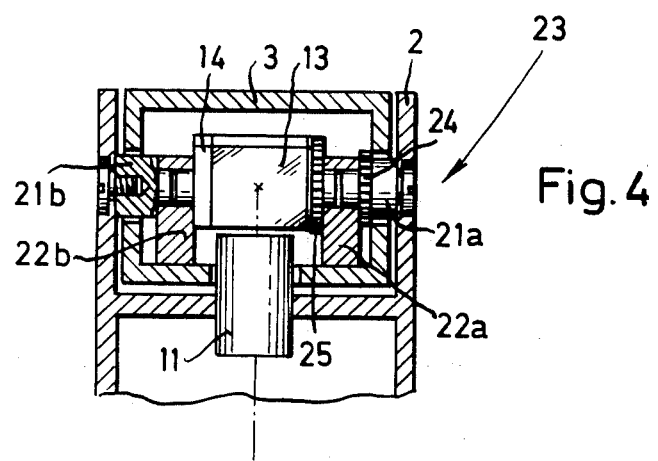
FIG. 4 is a similar section through the second hinge, approximately on the line of IV—IV of FIG. 2.

Referring to the hinge 12 illustrated in FIG. 3, this has two bearing trunnions 16a and 16b which project inwardly from the opposite side walls of the stationary part 1 and which are firmly fixed to those side walls by screws as illustrated. The axes of these trunnions are coincident with the hinge axis 16. Two brackets 20a and 20b on the extension arm 2 encircle and swing on the trunnions 16a and 16b respectively.

Between the two brackets 20a and 20b there is a U-shaped mirror carrier mounted for swinging movement by means of trunnions projecting from the carrier and entering bearing openings in the brackets, concentric with and conveniently formed as axial extensions of the bearing openings in which the trunnions 16a and 16b engage. This mirror carrier is so shaped and dimensioned that a mirror 9 mounted thereon has its reflecting surface lying in the common axis of both pairs of trunnions, which also is the above mentioned axis 16.

The trunnion 16a carries a pinion 17, either formed integrally with the trunnion or firmly fixed thereto. A second pinion 18, of a diameter larger than that of the pinion 17, is mounted on the mirror carrier 19. These two pinions mesh with two other pinions (not here shown) fixed to a common shaft so as to turn together. The sizes of all four pinions are selected to give a transmission ratio such that when the extension arm 2 swings through a given angle relative to the part 1, the mirror carrier 19 will be turned through half of this angle.

Figure 5:
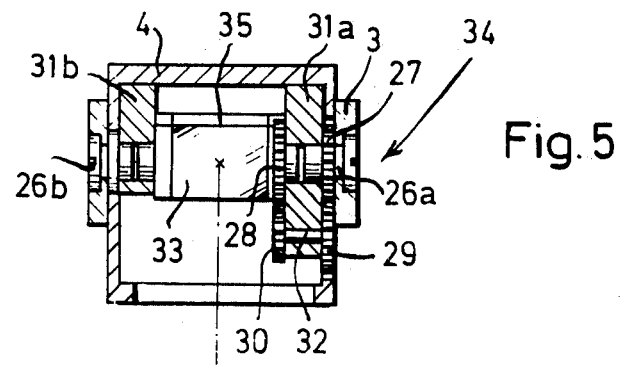
FIG. 5 is a similar section through the third hinge, approximately on the line V—V of FIG. 2.

The two pinions above mentioned, which mesh with the pinions 17 and 18, do not show in FIG. 3, but are of substantially the same construction and arrangement as the pinions 29 and 30 shown in FIG. 5.

The second hinge 23 has essentially the same construction as the first hinge 12, aside from its somewhat more compact shape in the direction of the hinge axis 21. The carrier arm 3 has two laterally spaced brackets 22a and 22b which bear on and swing on the two fixed trunnions 21a and 21b, firmly fixed to the side walls of the extension arm 2 by axial screws as shown. The carrier or holder 14 for the mirror 13 has trunnions which turn in these same brackets 22a and 22b, and which are coaxial with the trunnions 21a and 21b. As in the case of the first hinge, the reflecting surface of the mirror 13 lies in the hinge axis 21, which is coincident with the axes of the trunnions.

As before, there is a first pinion 24 firmly fixed to the stationary trunnion 21a, and a second pinion 25 fixed to and turning with the mirror carrier 14. Two other pinions, mounted on a common shaft to turn together, mesh with the respective pinion 24 and 25, the gear ratios being chosen so that the mirror carrier turns through only one-half the angle that the carrier arm 3 swings with relation to the extension arm 2. These two additional pinions do not show in FIG. 4, but the construction is similar to that of the two pinions 29 and 30 in FIG. 5.

The construction of the third hinge 34 is again similar to that of the first and second hinges 12 and 23, but in FIG. 5, illlustrating this third hinge, the entire pinion arrangement is visible. Due to space limitations, the construction of this third hinge must be somewhat more compact than that of the other hinges.

In this third hinge (FIG. 5) there are two brackets 31a and 31b which are part of the eyepiece attachment 4, with axially aligned bores through both of these brackets. The trunnions 26a and 26b fixed to the respective side walls of the carrier arm 3 enter these bores so that the brackets and the entire eyepiece 4 mounted on the brackets may swing on the trunnions. The mirror carrier 35, carrying the mirror 33, is located between the brackets 31a and 31b, and has trunnions extending into and turning in the same bores in the brackets. As in the case of the other hinges, the reflecting surface of the mirror lies in the axis of the trunnions, i.e., the swing axis 26 of this hinge.

There is a fixed pinion 27 fastened to the stationary trunnion 26a on one side of the bracket 31a, and a pinion 28 fastened to the mirror carrier 35 is on the other side of the bracket 31a. The other two pinions 29 and 30, which mesh respectively with the pinions 27 and 28, are fixed to a common shaft 32 which extends through and turns in a bore in the bracket 31a. As in the other hinges, the gear ratios are such that the mirror turns through half the angle that the eyepiece attachment 4 swings with relation to the carrier arm 3. Due to considerations of space, the pinions 27 and 29 are located in the plane of a side wall of the eyepiece attachment 4, suitable openings being provided in this side wall to accommodate the pinions.

The ocular (eyepiece member 5) of the instrument can be freely adjusted in height and depth as well as in its angle of observation, against the friction present in the hinges 12, 23, and 34, the friction serving to hold the parts in any position to which they may be adjusted. In order to limit the swinging movement at the various hinges, suitable conventional stops (not shown) are provided. Also, for the adjustment of the friction to the extent desired to hold the parts in adjusted position without so much friction as to make adjustment difficult, friction clamping screws (not shown) are provided. Both the limiting stops and the clamping screws have been omitted from the drawings, for the sake of simplicity of description, and because such stops and screws are conventional and well known in the art.

These adjustment movements in height and depth and in angle of observation are independent of each other. The height and depth of the ocular can be adjusted by swinging on the first two hinges 12 and 23 without requiring any specific angle of observation, and the angle of observation is separately adjustable by swinging the ocular on the hinge 34.

What is claimed is:

1. An articulated microscope tube including optical means for conducting an optical beam from a microscope objective to an eyepiece, said tube comprising a plurality of sections including a first section (1), a second section (2) mounted to swing relative to the first section about a first hinge axis (16), and at least one additional section (3) mounted on said second section to swing relative thereto about a second hinge axis (21) spaced from and parallel to said first hinge axis.

2. The invention defined in claim 1, further comprising a third section (4) mounted on said additional section (3) to swing relative thereto about a third hinge axis (26) spaced from and parallel to said second hinge axis (21), said third section constituting an eyepiece attachment member.

3. The invention defined in claim 2, further comprising a binocular eyepiece (5) mounted on said eyepiece attachment member.

4. The invention defined in claim 2, wherein said second section extends in a generally horizontal direction, subject to limited upward and downward swinging on its said axis (16), and wherein said additional section (3) extends in a generally vertically downward direction from its said hinge axis (21), subject to limited horizontal swinging on such axis (21).

5. The invention defined in claim 1, wherein said first section (1) is a stationary section and is provided with attachment means (6) for attaching auxiliary apparatus.

6. The invention defined in claim 2, further comprising a plurality of mirrors within said tube, one at each of said axes, for directing said beam along said tube, and transmission means effective when any section is swung on its axis relative to an adjacent section for turning the mirror at that axis through an angle which is one-half of an angle of swing.

7. The invention defined in claim 6, wherein said transmission means includes a first pinion fixed relative to a first one of two sections hinged to each other, said pinion being coaxial with respect to a swing axis of the two sections, a second pinion fixed to a mirror at that axis, and two other pinions mounted on the other of the two sections and connected to turn together and meshing respectively with said first and second pinions.

8. The invention defined in claim 2, further comprising an optical system (11, 15) within said tube for forming an intermediate image.

9. The invention defined in claim 8, wherein the image viewed by an observer looking into an eyepiece mounted on said eyepiece attachment is an erect image, properly oriented with respect to the object on which said microscope objective is focused.

10. The invention defined in claim 2, wherein hinges (12, 23, 34) at said hinge axes (16, 21, 26) are connected to each other by a parallelogram-like link transmission.

11. An articulated microscope tube for conveying an optical beam of a microscope to an observation eyepiece, said tube comprising a fixed part and a plurality of sections supported from said fixed part, a first section being hinged to said fixed part and each succeeding section being hinged to a preceding section for swinging movement relative thereto about a hinge axis, a final one of said sections carrying an observation eyepiece, said sections being arranged to form a generally crane-like structure with hinges so arranged that said eyepiece may be moved both vertically and horizontally to various positions in space and may be tilted to various angular positions of viewing regardless of its vertical or horizontal position in space, and optical means within said tube at each hinge for directing an optical beam traveling in one section of the tube properly into the next section of the tube regardless of the angle which the next section may make with the preceding section.

12. A microscope tube for directing an optical beam from a fixed optical axis to an eyepiece which is capable of adjustment upwardly and downwardly and also forwardly and backwardly in depth toward and away from an observer and also of tilting to vary the angle of viewing, said tube comprising a stationary part through which said optical beam passes along said fixed optical axis, a plurality of movable tube parts connected to each other in sequence by hinges so that adjacent tube parts may swing relative to each other on hinge axes, a first movable tube part being hinged to said stationary part to swing relative thereto on a hinge axis, at least some of said hinge axes being parallel to each other, an observation eyepiece mounted on a last one of said movable tube parts, and optical means located substantially at each of said hinge axes for deflecting said optical beam arriving at a hinge axis so as to pass in a proper direction into the next adjacent tube part.

13. The invention defined in claim 12, wherein said optical means at each hinge axis comprises a mirror having a reflecting surface substantially coincident with the hinge axis at which it is located, and transmission means effective when two parts hinged to each other at such axis are swung relative to each other through a given angle, for rotating the mirror through half of said given angle.

* * * * *

UNITED STATES PATENT AND TRADEMARK OFFICE
CERTIFICATE OF CORRECTION

PATENT NO. : 4,576,450

DATED : March 18, 1986

INVENTOR(S) : Klaus Westphal

It is certified that error appears in the above-identified patent and that said Letters Patent is hereby corrected as shown below:

In the heading of the patent, insert the following:

[30]  Foreign Application Priority Data

Feb. 18, 1983  [DE]  Fed. Rep. of Germany    3305650

Signed and Sealed this

Tenth Day of June 1986

[SEAL]

Attest:

DONALD J. QUIGG

Attesting Officer

Commissioner of Patents and Trademarks